INVENTOR.
LEONARD P. FRIEDER
BY Lester W. Clark
ATTORNEY ated Aug. 10, 1965

3,199,814
BREAKABLE CROWN PARACHUTE
Leonard P. Frieder, 145 Station Road, Kings Point,
Great Neck, Long Island, N.Y.
Filed Dec. 3, 1963, Ser. No. 327,587
17 Claims. (Cl. 244—145)

This invention relates to a parachute having a breakable crown, and more particularly to a parachute having a central portion of the crown of the canopy which is composed of a sheet material which has an appreciable strength, but which fractures when the limit of that strength is exceeded.

It has been a common procedure in the past to manufacture parachutes with a central opening in the apex portion of the crown of the canopy of the parachute. This central opening may be desired for a number of purposes. The most commonly intended purpose for such a center opening is for stabilization in the operation of the parachute during descent. Another important purpose for a central vent is involved in the specialized use of the parachute for the purpose of stabilizing a rocket which is launched in the air. The rocket and its parachute may be carried aloft by an airborne vehicle such as a conventional aircraft, and then dropped from the aircraft. The rocket is then stabilized by the parachute before it is launched so that it will be accurately directed upwardly. For such purposes, the vent opening in the parachute may be made large enough so that the rocket can be launched through the opening.

If the central vent opening is not provided in the rocket stabilizing parachute, then the rocket must pass through the parachute and destroy it. The loss of the parachute is not serious, but the material of the parachute usually fouls the rocket and particularly the rocket guidance fins, so as to spoil the rocket aim, guidance, and aerodynamic characteristics. However, if a central vent opening is provided on a rocket stabilizing parachute which is truly large enough to provide absolutely safe clearance of all parts of the rocket, including the fins, then a very substantial portion of the parachute is omitted so that the remainder of the parachute must be substantially larger than it otherwise would have to be. However, a more important consideration in that with a large central vent opening in the crown of the canopy of the parachute, considerable difficulty is often encountered in obtaining initial deployment of the parachute. It is a recognized fact in the art of parachute design that the provision of a center vent reduces the speed of initial deployment of a parachute, and therefore makes deployment more difficult and less reliable.

Accordingly, it is one object of this invention to provide an improved parachute which has the deployment characteristics of an unvented canopy crown and which has essentially the same advantages as a vented crown canopy parachute after opening.

Another object of the invention is to provide a parachute structure which is particularly well adapted for the specialized purpose of stabilizing a rocket which is launched in the air after having been carried aloft by other means, and in which the parachute is particularly designed to avoid any interference with the operation of the rocket.

In carrying out the objects of this invention, a parachute structure is provided in which at least the central or apex portion of the crown of the canopy consists of a non-woven breakable sheet material.

One of the most useful materials for the non-woven breakable sheet material at the center of the crown of the canopy in the present invention is paper. If paper, or other non-woven breakable sheet material, is sufficient in strength for the center of the crown of the canopy of the parachute then it follows that the entire parachute canopy can be composed of paper rather than cloth. However, paper and other non-woven breakable sheet materials are so limited in strength in comparison to woven textile cloth that a much heavier and stiffer structure is required for the parachute canopy if the entire canopy is composed of such material. Furthermore, the stiffness prevents packing of the parachute into a small, confined space such as is possible with cloth parachutes. Therefore, the structure composed entirely of non-woven breakable sheet material would be much too bulky and heavy.

Accordingly, it is a further object of the invention to provide a strong light weight parachute structure which is capable of a high packing density while at the same time possessing the desirable opening characteristics of a closed crown parachute structure and having a center portion which does not interfere with the vertical launching of a rocket supported by the parachute.

In carrying out the above objects of this invention in one preferred embodiment thereof, a parachute is provided having a canopy in which only a center panel consists of a non-woven breakable sheet material.

Other objects and advantages and features of this invention will be apparent from the following specification and the accompanying drawings which are briefly described as follows:

FIG. 3 is an enlarged sectional detail taken through section 3—3 of FIG. 2 and illustrating a preferred method of attachment of the breakable center panel to the remainder of the canopy.

FIGURE 3a is a sectional detail corresponding to that of FIG. 3, but illustrating a modified embodiment of the invention employing a double breakable center panel.

Figure 2:
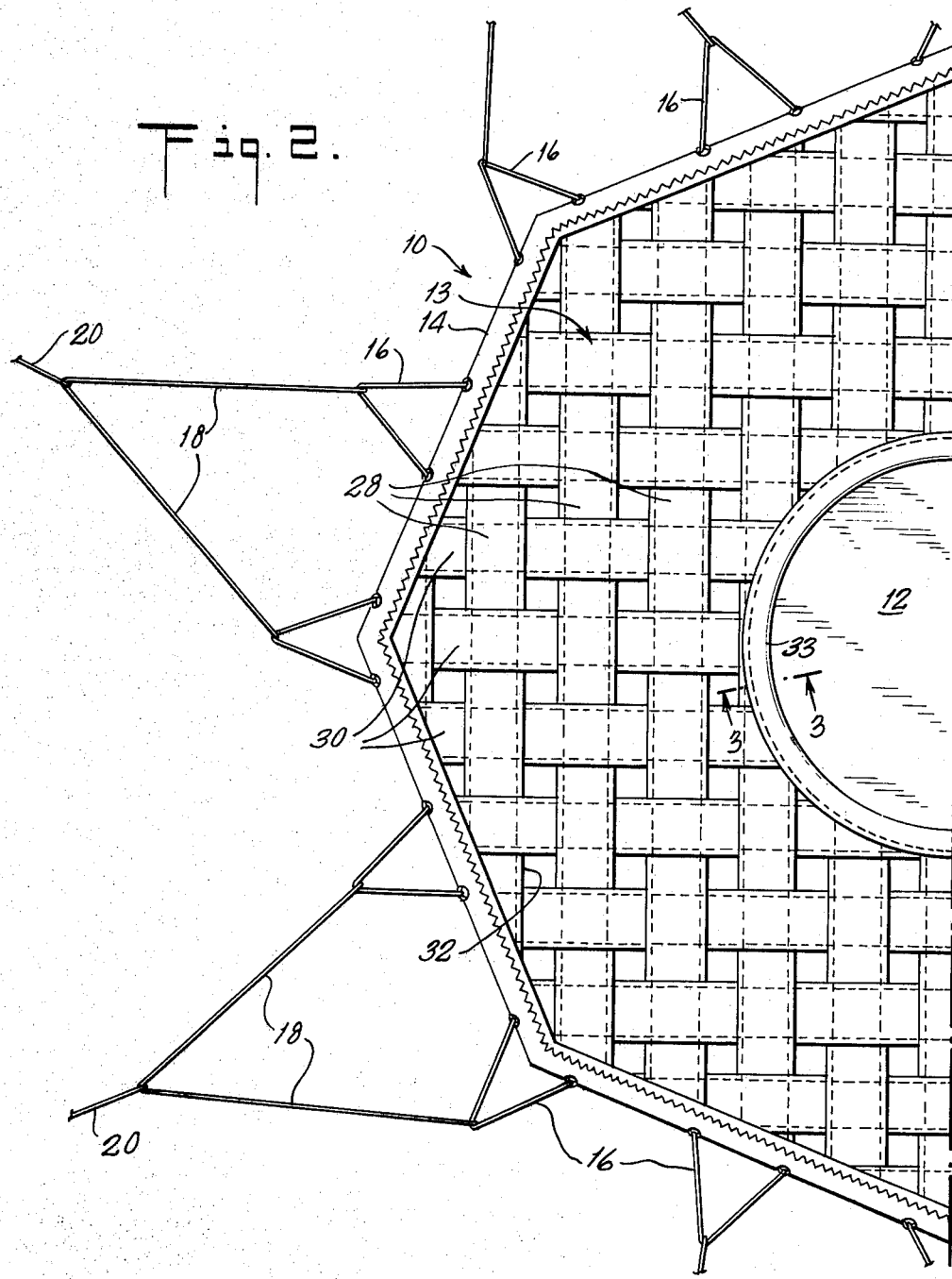
FIG. 2 is a detail view showing features of construction of the parachute canopy in a preferred embodiment of the present invention.

And FIG. 4 is an enlarged detail view illustrating details of construction of the canopy of FIG. 2 at the hem portion thereof.

Figure 1:
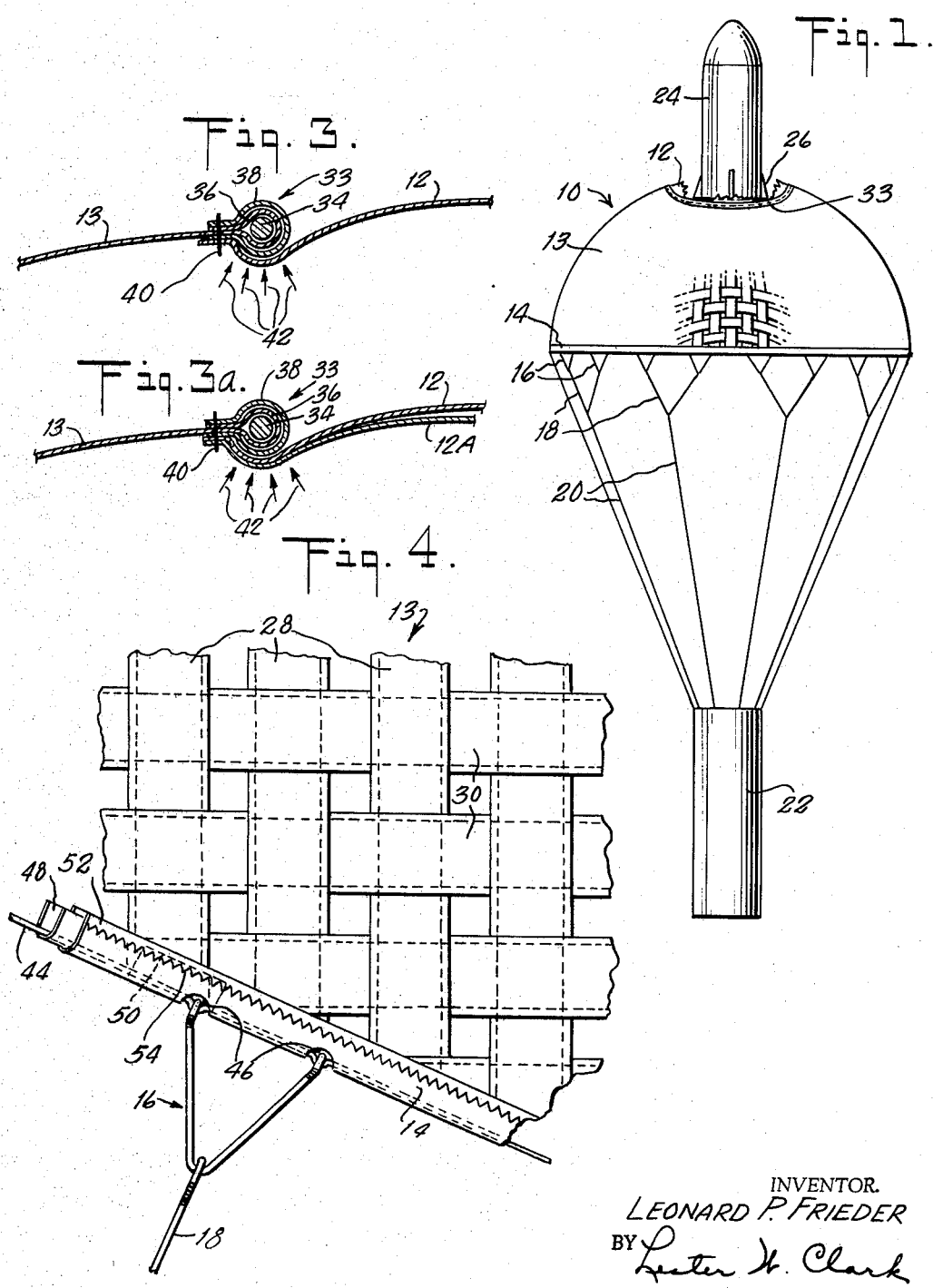
FIG. 1 illustrates one embodiment of the parachute of this invention in its inflated state and illustrating one important use.

Referring more particularly to FIG. 1, there is shown a parachute in accordance with the present invention including a canopy 10 with the central portion of the crown of the canopy at 12 being constructed of a breakable sheet material. All of the remainder 13 of the canopy is generally composed of woven textile material. The canopy 10 is terminated at the bottom edge by a hem 14 to which there are attached shroud lines including rat lines 16 and 18 and main shroud lines 20. The main shroud lines 20 are attached at their lower ends to a parachute load 22. The load 22 may consist of a container for a rocket 24. After the load has been dropped from an air borne vehicle such as a high altitude aircraft, the parachute is opened so as to stabilize the load container 22 having the rocket 24 within it. After the load is stabilized beneath the parachute, the rocket 24 is fired and breaks and penetrates through the breakable central portion 12 of the crown as indicated in the drawing.

As used in this specification, the term "breakable" describing the sheet material in the central portion 12 of the crown of the parachute canopy 10 means a material which is not not necessarily weak or fragile, but which does have appreciable strength. On the other hand, it is a material which breaks and separates rather sharply and cleanly when it is subjected to a real impact or a sudden stress exceeding its strength such as is encountered when the rocket 24 forces its way through. This property of this material may be characterized in various other different ways. For instance, it may be said that it is limited in its elasticity, or that it is a material which is provided with regions of easy separability. However, the main point with respect to the present invention is that the material breaks and tears readily when the limit of its strength is exceeded. The breakable panel 12 must not have the tear and break resistance properties which are commonly possessed by high strength textile woven fabric materials which are normally desirable for parachute canopies. This is true because such materials tend to catch and foul the control surfaces 26 of the rocket 24.

The breakable material of the panel 12 may have various different compositions as long as the breakable property is provided. One of the most useful and most easily obtained materials is paper. An example of a paper which has been found to be particularly useful in this invention is a porous paper which is commonly employed for purposes such as filters where there is an appreciable flow of air or water through the paper. Such a paper may have a weight in the order of twelve and a half pounds per ream, and a permeability to air flow of approximately 200 cubic feet of air per square foot when subjected to a pressure differential equivalent to one half inch of water. Despite the porosity and air permeability, this paper has a strength which is relatively high considering its weight.

Other examples of commonly available breakable sheet materials which are possessed of the desired properties are polypropylene, or cellophane. Non-woven cloth is another example of a material possessing the desired properties. All of the best materials for breakable panel 12 appear to be of non-woven construction, and this feature together with the breakable feature seem to distinguish these materials from the high strength woven fabric textile material which is desired for the remainder of the canopy 10.

The breakable material panel 12 is made to be slightly larger than absolutely necessary to fill its portion of the canopy so that this panel is not subjected to any substantial tension forces from the textile portions 13 of the canopy.

The remainder 13 of the canopy 10, including the skirt portions, is preferably composed of high strength textile woven fabric material such as nylon because such a material is lighter and more compact within a given strength limit requirement than is the breakable sheet material of which the panel 12 is composed. While portions 13 may be constructed of any known parachute canopy material, it is preferred that the canopy, exclusive of the panel 12, should be of the ribbon type and of a special construction as illustrated in detail drawing FIG. 2.

FIG. 2 is a detail drawing illustrating a preferred construction for the canopy of the parachute of the present invention. For clarity of presentation, FIG. 2 illustrates only one half of the parachute canopy 10, the other half being symmetrical with the half which is shown, and identical in construction. As shown in FIG. 1, the canopy 10 preferably is preformed into a hemispherical or mushroom shape, rather than being formed in the "flat." However, for simplicity and clarity of the drawings, the detailed construction of the canopy as it is shown in FIG. 2, is illustrated as it would be if formed in the flat. It should be understood also that the parachute generally has a canopy which is larger, in comparison to the sizes of the canopy components, than that illustrated in FIG. 2. As illustrated in FIG. 2, the woven textile portions 13 of the canopy including the hem 14, are preferably formed from textile ribbons. Two crossed sets of ribbons 28 and 30 are provided and are interconnected in a basket weave pattern. The ribbons are preferably stitched together at their intersections. The adjacent ribbons of each set are preferably spaced apart so as to define vent openings therebetween as indicated at 32. The aggregate area of the vent openings may preferably be in the order of 25% of the total area of the ribbon structure, although this area may vary through the range from approximately 15% up to 50% or more depending upon various factors and the altitude and other conditions of intended use. The two sets of ribbons 28 and 30 may be arranged at angles to one another which are different from the ninety degree angles shown. These angles may vary to a minimum acute angle in the order of 50 degrees or less.

The hem 14 of the canopy may be circular in shape, or preferably it may be in the form of a regular polygon having more than four sides. As shown in FIG. 2, it is in the form of an octagon. The polygonal hem shape has substantially the same properties and characteristics as a canopy formed with a circular shape and it is preferred over the circular shape chiefly because it has been found to be somewhat easier to fabricate the parachute canopy with this shape. The rat lines 16 are attached to the hem 14 by means of a hem cord which is contained within the hem 14. The construction of the hem 14 including the hem cord and showing the method of attachment of the rat lines 16 is shown and described more fully in connection with FIG. 4 below. All of the shroud lines, including the rat lines 16 and 18, and the main shroud lines 20, are connected to the hem 14 in a regular pattern which is functionally related to the individual straight sections of the hem 14.

The ribbon portions of the canopy 10, including the ribbons 28 and 30, and the hem 14, may be constructed in accordance with the teachings of the copending patent application Serial No. 327,747 for Ribless Ribbon Parachute, filed concurrently with the present application by the same inventor. Various modifications in the ribbon portions of the canopy illustrated in that patent application are also applicable to the ribbon portions of the canopy in the present invention. One of the modifications illustrated in that patent application which is also quite valuable in the present invention involves the employment of slotted ribbons in which each ribbon is alternately passed through slots in the intersecting members of the other set of ribbons, and has ribbons of th eother set threaded through its own slots. This may be referred to as a cross-slotted structure.

The center panel 12 is joined to the portion 13 of the canopy at a joint at 33 which is shown in detail in FIG. 3 and described in connection therewith.

FIG. 3 is an enlarged detail sectional view of the particular portion of the structure of FIG. 2 indicated at section 3—3 in FIG. 2. This shows the details of the structure of the joint at 3—3 between the woven cloth portions of the canopy and the breakable center panel 12. This portion 33 of the textile woven fabric 13 where the breakable panel 12 of the canopy is attached is formed as a welted edge. It includes a welt cord 34. This welt 34 is preferably inelastic, when longitudinally stressed so as to reinforce the edge of breakable panel 12. The welt 34 is surrounded by a fold of the ribbon material forming the woven cloth portion 13 of the canopy as indicated at 36. While several thicknesses of ribbon may be included in parts of the joint at 33, only one has been shown for purposes of clarity in FIG. 3. The material surrounding the welt 34 is further reinforced by an additional outer tape member 38. The two edges of the tape 38, the folded cloth edge 36, and the edge of the breakable panel 12 are all stitched together to the main body of the cloth portion 13 by means of stitching indicated at 40.

Since the panel 12 is composed of a relatively inelastic breakable material as discussed above, stitching this material at 40 provides a potential weakening at the stitching, particularly because of the perforations created by the stitching. However, because of the novel method of construction of this joint 33 as illustrated in FIG. 3, the stresses exerted upon the breakable panel 12 at the stitching 40 are substantially reduced. This makes it possible for the breakable panel to withstand a considerable total stress without failure at the stitching 40. The explanation for this is believed to be as follows: Because of the presence of the welt 34, the welted edge at 33 of the cloth portion 13 of the canopy has a thickened or enlarged cross section. Since the breakable panel 12 is attached at the stitching 40 on the underside of the joint structure 33, the forces beneath this portion of the breakable panel 12 are generally as indicated by the distributed arrows 42. It is to be seen that these forces press the edge of the breakable panel 12 tightly against the underside of the enlarged portion of the structure at 33. This occurs in the region of the breakable panel 12 between the main body of the panel, which is unsupported, and the position of the stitching 40. Thus the forces indicated tional engagement between the edge of the breakable panel by the arrows 42 are in a position to establish a frictional engagement between the edge of the breakable panel 12 and the enlarged welted edge at 33. This frictional engagement resists any radial movement of the edge of the breakable panel 12 and thus serves to assist the stitching 40 in holding the edge of the breakable panel 12 without having it tear loose.

A large proportion of the stress in the panel 12 is transferred to the cloth portion 13 through the welt structure 33 rather than being transmitted through the stitching 40. Hence the weakened portion of the panel 12 along the line of stitching carries less load than the other parts of the panel 12. This makes use of a well-known principle which is akin to that illustrated by the common method of tightening heavy ropes on a capstan such as used on board ship. It is well known that if a few turns of the rope are taken around the capstan, then a small force on the loose end, such as can be easily exerted by one man, is sufficient to keep the rope from slipping on the capstan even though the loaded end of the rope may be subjected to a very high force. The difference between the small holding force and the large load force is accounted for by the frictional engagement of the rope on the capstan, and this frictional engagement is largely derived from the tightening of the rope due to the load itself. In the present invention, the stitching provides the "small" holding force and the frictional engagement is between the edge of panel 12 and the welded edge at 33. The effect may be referred to as a "capstan" effect. The principle applies even though the edge of panel 12 only takes a fraction of one turn on the welted edge at 33. The features of the invention illustrated in FIG. 3 are not limited to the ribbon embodiment of the invention. The portions 13 of the canopy may be formed of closed textile materials, and the features of FIG. 3 are equally applicable to those forms of the invention.

FIG. 3a illustrates a modified embodiment of the invention in which the breakable center panel includes two separate plys or sheets 12 and 12A of breakable material. This structure may be referred to as a double breakable center paned. FIG. 3a corresponds in every other respect with FIG. 3 and is similarly lettered. The added breakable crown sheet has been found to add considerably to the strength of the breakable crown, while at the same time retaining all of the other advantages described above for the single sheet embodiment of the invention. Preferably, the two breakable crown sheets 12 and 12A are proportioned so that when the parachute is fully inflated, the two sheets are slightly separated. Thus, the lower sheet 12A is slightly smaller in size than the upper sheet 12 so that the upper sheet 12 billows upwardly independently of the lower sheet 12A and the lower sheet 12A is not directly supported against the under side of the upper sheet 12. With this arrangement, the aerodynamic characteristics are such that each of the breakable crown panel sheets 12 and 12A assume a separate portion of the load to which the center panel section of the parachute canopy is subjected.

FIG. 4 is an enlarged detail view showing only a portion of the canopy at the hem edge. It illustrates details of the construction of the hem portions of the embodiment of the canopy shown in FIG. 2. As previously indicated from the description of FIG. 2, the woven cloth portions 13 of the canopy are preferably formed from crossed ribbons 28 and 30, which are terminated at the hem 14. The shroud lines, commencing with the rat lines 16, are attached to the hem 14. These attachments are established through the medium of a floating hem cord 44 enclosed within the hem 14. Openings 46 are provided in the hem material to expose the hem cord 44 where the attachments of the ends of rat lines 16 are to be accomplished. The structure of the hem 14 includes an inner ply tape 48 which immediately surrounds and absorbs abrasion from the hem cord 44. The ends of the ribbons 28 and 30 which are attached to the hem 14 are doubled around the outside of the inner ply tape 48. This is illustrated by the dotted lines at 50 indicating the position of the end of the first ribbon 28. An outer reinforcement tape 52 surrounds the ends of the ribbons. Both edges of both the tapes 48 and 52, and both the entering side and the loose end of each of the ribbons 28 and 30 are fastened together by means of stitching indicated at 54. The openings 46 in the hem 14 for the attachment of the rat lines 16 to the hem cord 44 must involve cuts in both the inner and the outer ply tapes 48 and 52 of the hem 14, and cuts also in the ribbon ends which are attached in that portion of the hem 14, if any. It is very much preferred that the rat lines 16 should be attached at points on the hem 14 which are not at the center lines of the ribbons 28 or 30. It is preferred, in fact, that these points of attachment should be spaced approximately midway between the center lines of ribbons which are attached at the hem. With the midway spacing of the points of attachment, the forces from the rat lines 16 are more evenly distributed to the ribbons through the medium of the hem cord 44. This feature is most important for those ribbons which are most directly in tension.

The hem cord 44 is preferably of resilient material and preferably has an unstressed circumference which is restricted in size so as to maintain a generally spherical or mushroom shape in the inflated parachute canopy. When the canopy is fabricated in the flat, as generally indicated in FIG. 2, the hem cord 44 and its restricted circumference are relied upon to accomplish a gathering and constricting effect on the hem edge of the canopy so as to establish the desired mushroom or spherical shape in the inflated parachute. The inter-action of the shroud lines upon the hem cord 44 is relied upon to enhance this constricting effect. Arrangements employing combinations of floating hem cords and shroud lines for accomplishing such a constricting effect are illustrated in U.S. Patent 2,365,184, issued December 19, 1944, and U.S. Patent 2,634,068, issued April 7, 1953. The various shroud line and hem cord arrangements disclosed in those patents may be employed in this invention as alternatives to the structure illustrated in FIG. 4. While it is possible to employ a flat formed canopy 10, as indicated in FIG. 2, it is preferred that the canopy should be preformed in a part-spherical or ellipsoidal shape such as indicated generally in FIG. 1. This may be accomplished by assembling the ribbons 28 and 30, and the other parts of the canopy, over a form having the desired shape. A successful procedure for accomplishing this assembly forms a portion of the invention described and claimed in the previously mentioned copending patent application Serial No. 327,747. The canopy having a preformed shape is particularly important when the parachute of this invention is to be used for the illustrated purpose of supporting rockets which are to be launched through the breakable crown of the parachute. This is true because the preformed parachute canopy results in a very stable parachute, and stability is very much to be desired when the parachute serves to support a rocket launching container.

It has been found in practice that a paper breakable crown will withstand the shock forces of the deployment and inflation of the parachute at speeds up to 100 to 125 miles per hour. Accordingly, if speeds above this range are to be encountered, it is preferred that the parachute and its load should be decelerated to below 100 to 125 miles per hour before the breakable crown parachute is deployed. This may be accomplished conveniently by employing a fairly large pilot parachute which decelerates the load and the breakable crown parachute prior to deployment thereof. After deployment of the breakable crown parachute, the pilot parachute is released.

While certain variations and modifications of the present invention will occur to those who are skilled in the art, it is intended that the following claims shall cover the entire valid scope of this invention including all such variations and modifications.

I claim:

1. A parachute canopy consisting of a central portion and a peripheral portion encircling said central portion, said central portion consisting of a non-woven breakable sheet material, and said peripheral portion being comprised of woven textile cloth.

2. A parachute in accordance with claim 1 in which said breakable sheet material is paper.

3. A parachute in accordance with claim 1 in which said breakable sheet material is a non-woven cloth.

4. A parachute in accordance with claim 1 in which said breakable sheet material is polypropylene.

5. A parachute in accordance with claim 1 in which said breakable sheet material is cellophane.

6. A parachute having a canopy including a breakable center portion and a non-breakable outer portion, said outer portion being comprised of woven textile fabric material, the inner edge of said outer portion having an enlarged cross-section at the joint with said center portion, the edge of said center portion being fastened to the under side of said outer portion at a radius beyond said enlarged cross-section, said center portion being comprised of at least one sheet of breakable material.

7. A parachute in accordane with claim 6 in which said center portion is comprised of a plurality of sheets of breakable material.

8. A parachute having a canopy with a breakable center panel, said canopy being comprised of a woven textile fabric terminated at the edges in a hem, said hem including a floating hem cord positioned therein, said hem including spaced openings therein to expose said floating hem cord, shroud lines connected to said hem cord at said openings and arranged for connection to a parachute load, the canopy of said parachute including a center panel consisting of non-woven breakable sheet material, said center panel being connected to the textile structure of said canopy at a circular joint.

9. A parachute having a canopy including a breakable center portion and a non-breakable outer portion, said breakable center portion consisting essentially of two separate plys of breakable sheet material, said outer portion being comprised of woven textile fabric material, the inner edge of said outer portion being a welted edge containing a welt of appreciable size to provide an enlarged cross-section, the edges of both sheets of breakable material being connected to said outer portion at a radius beyond the radius of said welted structure and on the under side of said outer portion, the upper sheet of said breakable portion being larger than the lower sheet of said breakable portion so that said sheets are separated at the center when the parachute is inflated.

10. A parachute having a breakable center panel in the canopy thereof, said parachute being comprised of a woven textile fabric canopy terminated at the edges in a hem, said hem including a floating hem cord positioned therein, said hem including spaced openings therein to expose said floating hem cord, shroud lines connected to said hem cord at said openings and arranged for connection to a parachute load, the canopy of said parachute including a center panel consisting of non-woven breakable sheet material, said center panel being connected to the textile structure of said canopy at a circular joint, said textile structure of said canopy being terminated at said circular joint in a welted edge containing a welt of appreciable size to provide an enlarged cross section at said welted edge, the attachment of the edges of said center panel at said joint being at a radius greater than the radius of said welted edge and on the under side of said textile structure.

11. A parachute in accordance with claim 8 in which said non-woven breakable sheet material is paper.

12. A parachute in accordance with claim 8 in which said non-woven breakable sheet material is a non-woven cloth.

13. A parachute in accordance with claim 8 in which said non-woven breakable sheet material is polypropylene.

14. A parachute in accordance with claim 8 in which said non-woven breakable sheet material is cellophane.

15. A ribbon parachute having a canopy including a breakable center portion and a non-breakable outer portion, said outer portion being comprised of woven nylon fabric ribbons and including an outer hem with a floating hem-cord therein, the inner edge of said outer portion being a welted edge to provide a thickened cross-section at the joint with said center portion, the edges of said center portion being fastened to the under side of said outer portion at a radius beyond said welted inner edge thereof, said center portion being comprised of at least one sheet of non-woven breakable material.

16. A parachute in accordance with claim 15 in which said center portion is comprised of a plurality of separate sheets of non-woven material.

17. A ribbon parachute having a breakable center panel in the canopy thereof, said parachute being comprised of a ribbon canopy including two crossed sets of generally parallel ribbons, the adjacent members of each set of ribbons being spaced apart to provide air vents therebetween, the hem edge of said canopy being comprised of at least one reinforcing tape which is stitched at both sides to the canopy ribbons to form a hem, a floating hem cord positioned within said hem, said hem including spaced openings therein to expose said floating hem cord, shroud lines connected to said hem cord at said openings and arranged for connection to a parachute load, the canopy of said parachute including a center panel of non-woven breakable sheet material, said center panel being connected to the ribbon structure of said canopy at a circular joint, the ribbon structure of said canopy being terminated at said circular joint in a welted edge containing a welt of appreciable size to provide an enlarged cross-section at said welted edge, the attachment of the edges of said center panel to said ribbon structure being at a radius greater than the radius of said welted edge and on the under side of said ribbon structure.

References Cited by the Examiner

UNITED STATES PATENTS

| 2,067,571 | 1/37 | Jamieson | 46—86 |
| 2,730,316 | 1/56 | Frieder et al. | 244—145 |
| 2,959,385 | 11/60 | Buhler | 244—145 |

OTHER REFERENCES

Missile Engineering, Aug. 5, 1957, pages 76 and 77.

MILTON BUCHLER, *Primary Examiner.*

FERGUS S. MIDDLETON, *Examiner.*